(12) United States Patent
Feldmann

(10) Patent No.: US 6,173,500 B1
(45) Date of Patent: Jan. 16, 2001

(54) SEALING PLUG AS PART OF A RUBBER BOOT

(75) Inventor: Martin Feldmann, Gurnee, IL (US)

(73) Assignee: S-B Power Tool Company, Chicago, IL (US)

( * ) Notice: Under 35 U.S.C. 154(b), the term of this patent shall be extended for 0 days.

(21) Appl. No.: 09/374,275

(22) Filed: Aug. 13, 1999

(51) Int. Cl.$^7$ .................................................. B23D 51/00
(52) U.S. Cl. ........................................ 30/392; 173/DIG. 2
(58) Field of Search ........................... 30/392, 393, 394; 173/162.2, 171, DIG. 2

(56) References Cited

U.S. PATENT DOCUMENTS

| | | | |
|---|---|---|---|
| 3,413,498 | 11/1968 | Bowen, III et al. | 310/47 |
| 3,476,960 | 11/1969 | Rees | 310/50 |
| 3,489,936 | 1/1970 | Boyles | 310/47 |
| 3,577,579 | 5/1971 | Duve et al. | 15/22.1 |
| 3,936,213 | 2/1976 | Kappel | 408/67 |
| 4,056,935 | 11/1977 | Gassmann | 60/632 |
| 4,327,807 | 5/1982 | Emonet | 173/207 |
| 4,611,671 | 9/1986 | Hansson | 173/162.2 |
| 5,083,376 | 1/1992 | Lentino | 30/392 |
| 5,137,096 | 8/1992 | Druesdow | 173/171 |
| 5,165,173 | * 11/1992 | Miller | 30/392 |
| 5,607,023 | 3/1997 | Palm | 173/178 |
| 5,680,704 | 10/1997 | Okubo et al. | 30/124 |
| 5,689,891 | * 11/1997 | Bednar et al. | 30/392 |
| 5,855,070 | 1/1999 | Grabowski | 30/376 |
| 5,946,810 | * 9/1999 | Hoelderlin et al. | 30/392 |

\* cited by examiner

*Primary Examiner*—Hwel-Slu Payer
(74) *Attorney, Agent, or Firm*—Gardner Carton & Douglas

(57) ABSTRACT

A power tool has a housing that is surrounded in part by a rubber boot. The housing has an opening through which a fastener connects the housing a component of the housing. The boot has a plug portion formed on the inner surface that fits within the opening to seal the housing. The plug portion can have a seal lip followed by recesses to allow for pressure release.

14 Claims, 3 Drawing Sheets

SEALING PLUG AS PART OF A RUBBER BOOT

BACKGROUND OF THE INVENTION

1. Field of the Invention

The present invention relates to power tools that include a rubber boot and, in particular, to a plug that is a part of the rubber boot to seal an opening in the tool's housing.

2. Scope of the Prior Art

Power tools such as reciprocating saws and the like include a casing, or housing. The housing holds the motor and gear assembly of the tool. In order to secure the housing to the tool's frame or gearbox, the housing includes an opening so that a fastener can secure the housing to the tool. As is known, the gearbox includes grease or another type of lubricant to ensure that the gears function properly. In order that the grease does not leak from the tool, an end cap covers the opening. The cap includes a portion that fits within the housing to seal the housing and a head portion that can be extended out from the housing. Typically, the cap is made of plastic. Because of the design of the tool and the cap, the cap is an extra part that must be separately manufactured for use with the tool. As a separate part, the cap must also be assembled onto the saw.

Reciprocating saws, and other power tools, have a rubber boot component that surrounds a part of the housing. This rubber boot is provided at the front portion of the housing to make the housing more comfortable to grip. In addition, the boot insulates the saw during operation of the saw. The rubber boot is usually made of one piece that is pressed onto the housing of the tool in a known manner. On those tools that include a cap, the boot covers the cap. The application of the boot to the housing, which can use heat and pressure, can cause the cap to crack and break the seal.

SUMMARY OF THE INVENTION

The present invention relates to a rubber boot that is used with a power tool that overcomes the deficiencies of the prior art. As described above, power tools include a housing having openings. Fasteners, such as bolts, pass through the openings to attach the housing to a component of the tool such as a frame. A rubber boot encases the housing to insulate the tool. The boot of the present invention includes a sealing plug that is integrally formed on the inner surface of the boot. The sealing plug is inserted into the opening and the rubber boot is formed to the housing. In the preferred embodiment, the sealing plug includes seal lips and recesses to release pressure between the boot and the housing.

The seal plug of the present invention provides numerous advantages over the prior art. Integrating the plug into the boot reduces the number of parts necessary to manufacture a tool and reduces the steps necessary to assemble the tool. As the seal plug is made of the same material as the boot, it is less likely that the seal will be broken during manufacture or use. In addition, integrating the plug as a part of the boot increases the reliability that the plug will be inserted into the opening and that the opening is sealed. Overall, the seal plug of the present invention improves the performance of the tool, uses fewer parts makes it easier to assembly and reduces the costs of the tool.

These and numerous other features and advantages of the present invention will become readily apparent from the following description, the accompanying drawings and the appended claims.

DETAILED DESCRIPTION OF THE PRESENT INVENTION

Figure 1:
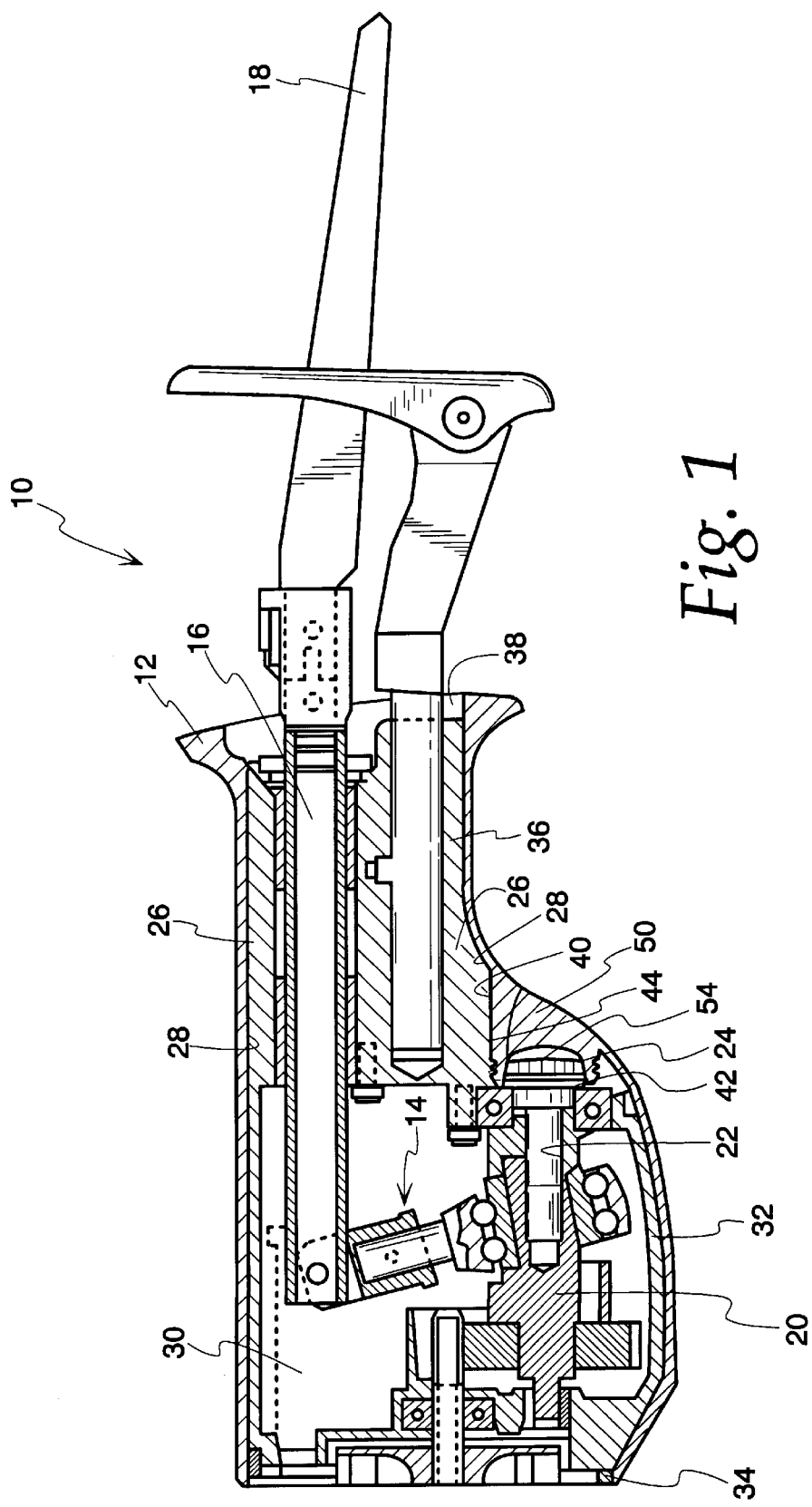
FIG. 1 is a cross sectional view of the front portion of a reciprocating saw having the rubber boot made in accordance with the principles of the present invention.

FIG. 1 shows the front portion of a reciprocating saw 10 that incorporates the rubber boot 12 of the present invention. It should be noted that the rubber boot 12 is explained in relation to the reciprocating saw but the principles of the present invention apply to any tool that incorporates such a boot and seals openings in the tool. The saw includes a gear assembly, generally referred to by numeral 14, that moves a plunger 16 in a longitudinal direction so that a blade 18 will cut a material. As is known in the art, the gear assembly 14 and its gearbox 20 require a lubricant, such as grease, in order to operate efficiently. The gear assembly has a bore 22 that extends through the gearbox 20. The inner surface of the bore is threaded to threadably receive bolt 24.

Front housing 26, having an outer surface 28, provides a cavity 30 to encase at least a part of the mechanisms that operate the saw 10, including gear assembly 14 and plunger 16. The front housing 26 has a body section 32 at a first end 34 and a throat section 36 at a second end 38. The plunger 16 moves through the throat section 36 and extends out of the second end to move the blade 18. As seen in FIG. 1, the gear assembly 14 is positioned within the body section 32 and connects to the plunger 16 to move the plunger 16. At its first end 34, the front housing 26 connects to a rear housing (not shown) that encases other components of the saw 10.

An opening 40 is provided through the body section 32 of the front housing 26. The opening 40 includes a hole portion 42 that opens into the cavity and a channel 44 that extends between the outer surface 28 and the hole 42. As seen, the bolt 24 passes through the opening 40 and into the bore 22 to secure the front housing 26 to the saw 10. In the prior art, a cap (not shown) is inserted into channel 44 to seal the hole 42 and the opening. The cap prevents grease from escaping the gear assembly 14 and dust from entering the cavity 30.

As seen in FIG. 1, the rubber boot 12 surrounds the outer surface 28 of the front housing 26. The rubber boot provides an insulating layer around the housing 26 since it is made of a suitable rubber material. The shape of the rubber boot 12 corresponds to the shape of the front housing 28 and has a body section 46 and a throat section 48.

Figures 2, 4:
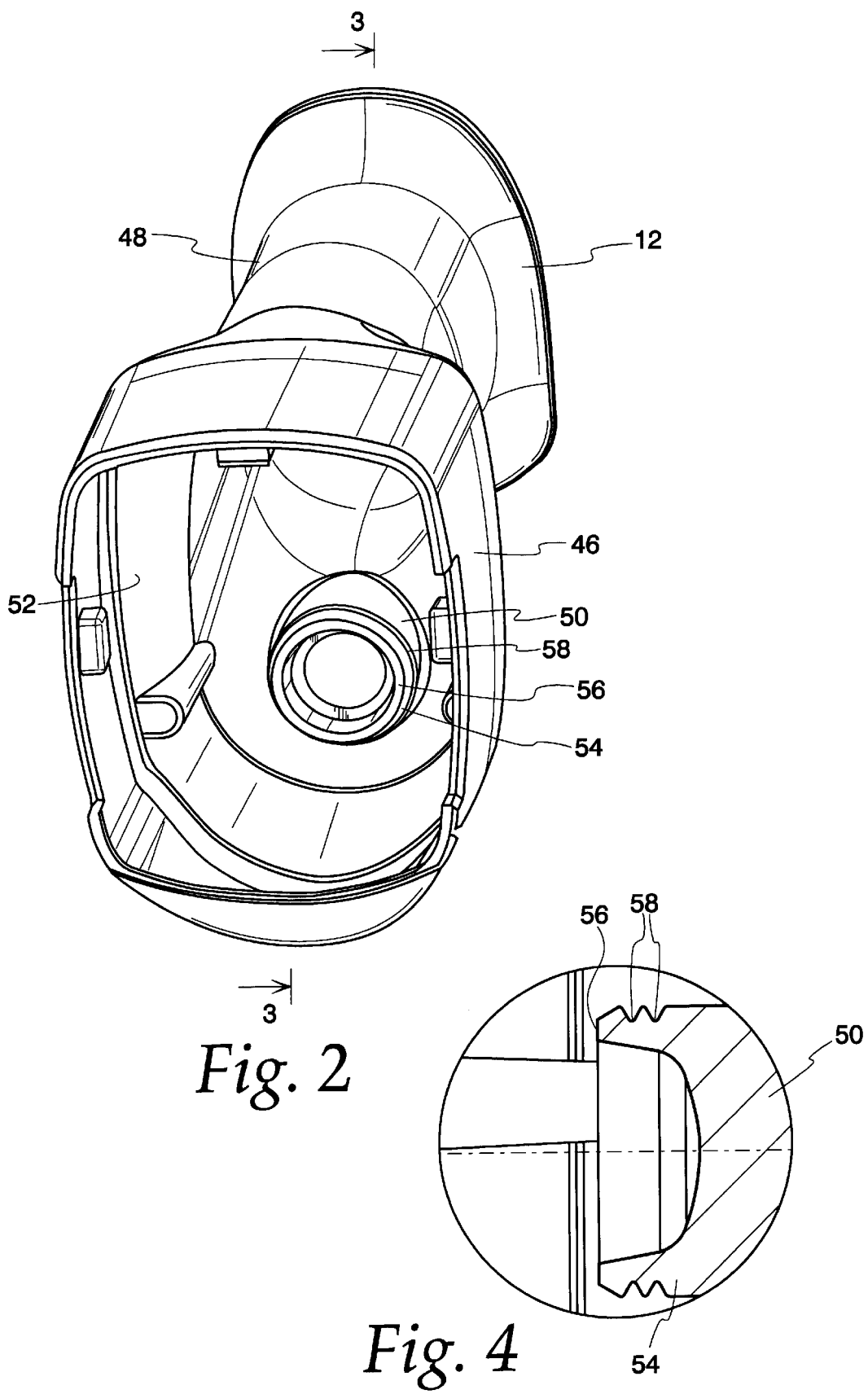
FIG. 2 is a perspective view of the rubber boot.
FIG. 4 is an enlarged view of the seal plug of the present invention as shown in FIG. 3.
Figure 3:
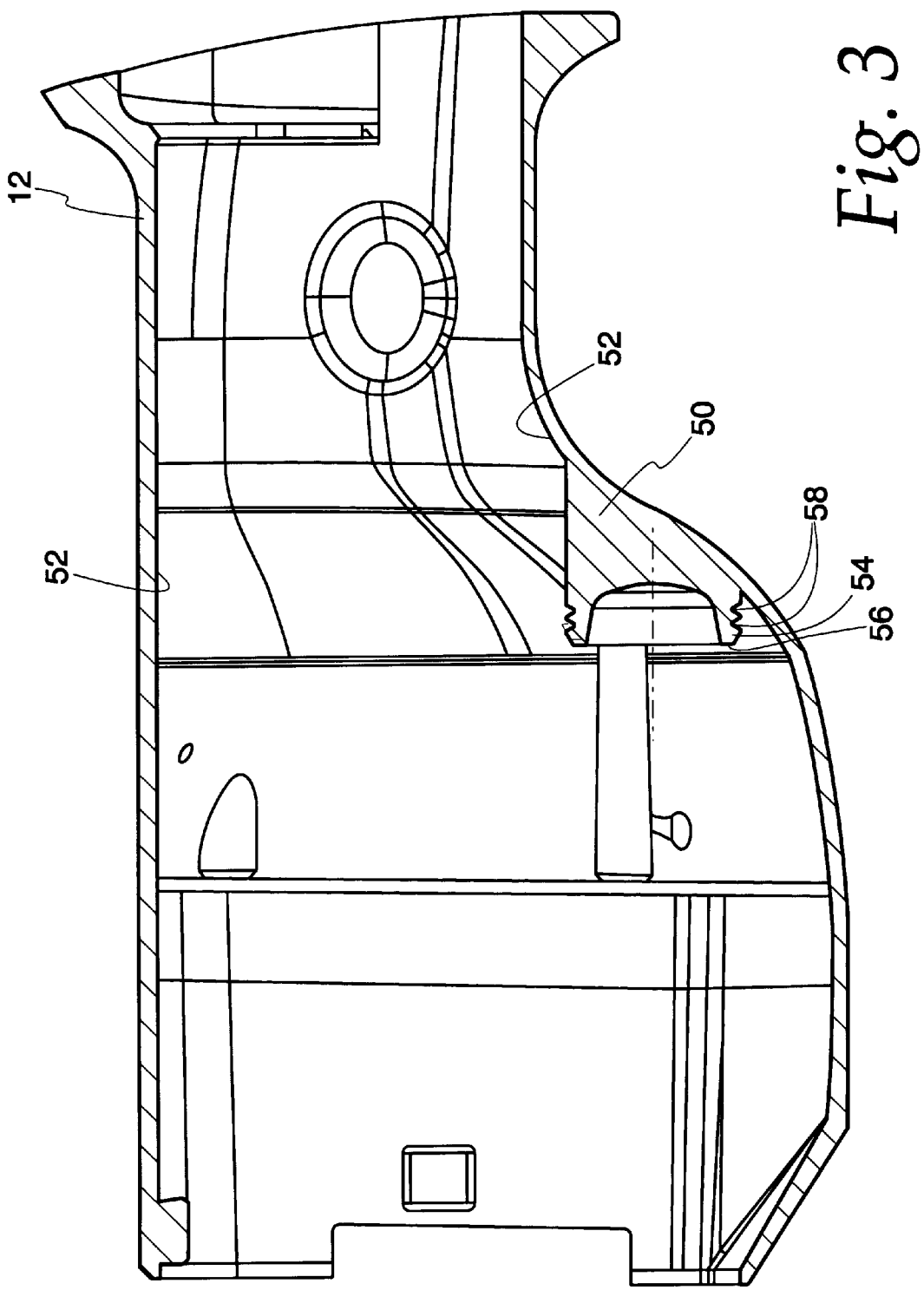
FIG. 3 is cross-sectional view of the rubber boot taken along the line 3—3 in FIG. 2.

The rubber boot of the present invention includes a plug portion 50 that is inserted into the channel 44 to seal the opening 40 and hole 42. Referring to FIGS. 2–4, the seal plug 50 is formed on inner surface 52 of the boot's body section 46. The plug 50 extends out from the inner surface 52 at a point that generally corresponds to the location of the opening 40 on the front housing's body section 32.

The plug 50 can be a solid piece of the boot's rubber material. In the preferred embodiment, the plug includes lip 54 that extend from the end 56. The lip 54 provides a concave shape to the end of the plug so that the plug will surround the bolt 24 and seal the opening 40. At least one recess, or groove, 58 is provided around the perimeter of the plug proximate the lips. The recess 58 provides for pressure release created in the opening by the pressure differential formed from using the tool. As is known to those skilled in the art, the pressure in the gear assembly increases during operation and then the pressure decreases as the tool cools. The multiple recesses 58 shown provide for optimum pressure release.

The original size of the rubber boot of the present invention, which incorporates the plug 50 is slightly larger than the front housing 26. In a manner known to those skilled in the art, the boot 12 is placed over the front housing 26. Typically, the boot is assembled to the housing by hand or with soap, but other suitable methods are known including the use of heat and pressure. The boot 12 fits over the front housing 26 so that the plug 50 fits into the opening 40. The plug extends into the channel 44 so that the lip 54 surrounds the bolt 24 and the end being adjacent to the end of the channel. Accordingly, the present invention seals the opening 40 without the need for the additional cap. Because the plug is made of the same material and is integral to the boot, forming the boot 12 to the front housing 26 will not damage the seal.

While the invention has been described in connection with a preferred embodiment, it is not intended to limit the scope of the invention to the particular embodiment set forth. On the contrary, it is intended to cover such alternatives, modifications and equivalents as may be included within the spirit and scope of the invention as defined by the appended claims.

What is claimed is:

1. A reciprocating saw comprising:

a gear assembly and a reciprocating blade;

a housing at least partially surrounding the gear assembly and defining an opening; and an insulating boot surrounding at least a portion of the housing and including a plug portion protruding into and sealing the opening in the housing, the boot and plug portion being formed of the same material in a single piece.

2. The reciprocating saw according to claim 1 wherein a bolt is fitted within the opening and the plug portion includes an end having a lip portion that surrounds and seals a portion of the bolt.

3. The reciprocating saw according to claim 2 wherein the bolt secures the housing to the gear assembly.

4. The reciprocating saw according to claim 1 wherein the plug portion includes a recess for pressure release.

5. The reciprocating saw according to claim 1 wherein the plug portion includes seal lips followed by a recessed area to allow for pressure release.

6. The reciprocating saw according to claim 1 wherein the single piece boot and plug portion are made of rubber.

7. The reciprocating saw according to claim 1 wherein the plug portion includes an end, and the end defines a plurality of concentric recesses to allow for pressure release.

8. A power tool comprising:

a housing at least partially surrounding a gear assembly of a power tool and having an inner side and an outer side, the housing defining a through opening; and an insulating boot covering at least a portion of the outer side of the housing and including a plug portion protruding into and sealing the through opening in the housing, the boot and plug portion being formed of the same material in a single piece.

9. The power tool according to claim 8 wherein a bolt is fitted within the opening in the housing, and the plug portion includes an end having a lip portion that surrounds and seals a portion of the bolt.

10. The power tool according to claim 9 wherein the bolt secures the housing to the gear assembly.

11. The power tool according to claim 8 wherein the plug portion including a recess for pressure release.

12. The power tool according to claim 8 wherein the plug portion including seal lips followed by a recessed area to allow for pressure release.

13. The power tool according to claim 1 wherein the boot and plug portion are made of rubber.

14. The power tool according to claim 8 wherein the plug portion includes an end, and the end defines a plurality of concentric recesses to allow for pressure release.

* * * * *